(12) United States Patent
Abolhassani et al.

(10) Patent No.: US 7,940,537 B2
(45) Date of Patent: May 10, 2011

(54) PARTIAL REGENERATION IN A MULTI-LEVEL POWER INVERTER

(75) Inventors: Mehdi Abolhassani, Austin, TX (US);
Thomas Keister, Georgetown, TX (US);
Alex Skorcz, Cedar Park, TX (US);
Enrique Ledezma, Austin, TX (US);
Ryan Edwards, Round Rock, TX (US)

(73) Assignee: TECO-Westinghouse Motor Company, Round Rock, TX (US)

(*) Notice: Subject to any disclaimer, the term of this patent is extended or adjusted under 35 U.S.C. 154(b) by 115 days.

(21) Appl. No.: 12/317,958

(22) Filed: Dec. 31, 2008

(65) Prior Publication Data

US 2010/0142234 A1    Jun. 10, 2010

(51) Int. Cl.
*H02M 1/12*    (2006.01)

(52) U.S. Cl. .............. 363/65; 363/37; 363/39; 363/78

(58) Field of Classification Search ............ 363/34, 363/35, 37, 39, 44, 65, 78, 84, 89
See application file for complete search history.

(56) References Cited

U.S. PATENT DOCUMENTS

| | | | |
|---|---|---|---|
| 3,581,212 A | 5/1971 | McMurray | |
| 3,867,643 A | 2/1975 | Baker et al. | |
| 4,052,657 A | 10/1977 | Kleiner et al. | |
| 4,674,024 A | 6/1987 | Paice et al. | |
| 5,619,407 A | 4/1997 | Hammond | |
| 5,625,545 A | 4/1997 | Hammond | |
| 5,638,263 A | 6/1997 | Opal et al. | |
| 5,734,565 A | 3/1998 | Mueller et al. | |
| 5,790,396 A | 8/1998 | Miyazaki et al. | |
| 5,841,645 A | 11/1998 | Sato | |
| 5,986,909 A | 11/1999 | Hammond et al. | |
| 6,005,788 A | 12/1999 | Lipo et al. | |
| 6,014,323 A | 1/2000 | Aiello et al. | |
| 6,031,738 A | 2/2000 | Lipo et al. | |
| 6,166,513 A | 12/2000 | Hammond | |
| RE37,126 E | 4/2001 | Peng et al. | |
| 6,229,722 B1 | 5/2001 | Ichikawa et al. | |
| 6,236,580 B1 | 5/2001 | Aiello et al. | |
| 6,262,555 B1 | 7/2001 | Hammond et al. | |
| 6,301,130 B1 * | 10/2001 | Aiello et al. | 363/37 |
| 6,320,767 B1 | 11/2001 | Shimoura et al. | |
| 6,340,851 B1 | 1/2002 | Rinaldi et al. | |
| 6,377,478 B1 | 4/2002 | Morishita | |
| 6,392,907 B1 | 5/2002 | Ichikawa | |

(Continued)

OTHER PUBLICATIONS

Dr. Keith Corzine, "Operation and Design of Multilevel Inverters," Developed for the Office of Naval Research, Dec. 2003, Revised Jun. 2005, pp. 1-79.

(Continued)

*Primary Examiner* — Jeffrey L Sterrett
(74) *Attorney, Agent, or Firm* — Trop, Pruner & Hu, P.C.

(57) ABSTRACT

In one embodiment, the present invention includes a medium voltage drive system having multiple power cells each to couple between a transformer and a load. A first subset of the power cells are configured to provide power to the load and to perform partial regeneration from the load, and a second subset of the power cells are configured to provide power to the load but not perform partial regeneration. A controller may be included in the system to simultaneously control a DC bus voltage of at least one of the first subset of the power cells, correct a power factor of the system, and provide harmonic current compensation for the system.

17 Claims, 6 Drawing Sheets

U.S. PATENT DOCUMENTS

| | | |
|---|---|---|
| 6,621,719 B2 | 9/2003 | Steiner et al. |
| 6,653,744 B2 | 11/2003 | Stricker |
| 6,697,271 B2 | 2/2004 | Corzine |
| 6,762,947 B2 * | 7/2004 | Hammond ................ 363/35 |
| 6,898,095 B2 | 5/2005 | Bijlenga et al. |
| 7,088,073 B2 | 8/2006 | Morishita |
| 7,164,201 B2 | 1/2007 | Manz et al. |
| 7,190,070 B2 | 3/2007 | Manz et al. |
| 7,242,584 B2 | 7/2007 | Kroneder |
| 7,414,866 B2 | 8/2008 | Zhang |
| 2003/0223251 A1 * | 12/2003 | Hammond ................ 363/35 |
| 2006/0274560 A1 | 12/2006 | Rastogi et al. |
| 2008/0079314 A1 | 4/2008 | Hammond |
| 2008/0080213 A1 * | 4/2008 | Zhang ................ 363/37 |
| 2008/0081244 A1 | 4/2008 | Hammond |
| 2008/0088186 A1 | 4/2008 | Hammond |
| 2009/0021922 A1 | 1/2009 | Popp et al. |
| 2010/0073970 A1 * | 3/2010 | Abolhassani et al. ........ 363/37 |

OTHER PUBLICATIONS

U.S. Appl. No. 12/495,359, Filed on Jun. 30, 2009 entitled, "Pluggable Power Cell For An Inverter," by Enrique Ledezma, et al.

U.S. Appl. No. 12/495,385, Filed on Jun. 30, 2009 entitled, "Providing Modular Power Conversion," by Enrique Ledezma, et al.

* cited by examiner

US 7,940,537 B2

PARTIAL REGENERATION IN A MULTI-LEVEL POWER INVERTER

BACKGROUND

Generally, equipment referred to as a power converter, inverter or drive is used to provide power to another piece of equipment such as a motor. Specifically, such a converter (converter is used generally herein to refer to converters, inverters and drives) is coupled to a utility connection to receive incoming input power such as three-phase AC power. The converter conditions the power to provide a conditioned power signal to the equipment to be powered. In this way, incoming power to the equipment may be of improved efficiency, leading to reduced costs to operate the equipment.

Multi-level power converters have been gaining popularity mainly due to improved power quality, lower switching losses, better electromagnetic compatibility, and higher voltage capability. These improvements in power conversion are achieved by using a multiple voltage step strategy. One common multi-level inverter topology is a series H-bridge inverter, in which multiple H-bridge inverters are connected in series. Since this topology consists of series power conversion cells, the voltage and power level may be easily scaled.

Typically, commercial converters are built up based on modular units, namely, power conversion cells, which are generally of a three-phase diode-based front-end rectifier, a DC-link capacitor bank, and a single-phase full-wave inverter. Using such cells, improved power quality at both the AC system and the motor sides can be realized.

However, this topology requires a large number of isolated DC voltage sources to supply each cell. The common practice is to use an isolation transformer to supply a rectifier of a power cell. However, the supply current to the rectifier contains many harmonic current components, which can be very disturbing for equipment and power systems, and cause electromagnetic interference (EMI).

Further, the normal operation of the inverter in each cell generates a large secondary current harmonic that is injected back into the DC-link capacitor. Thus a very large capacitor bank has to be used in order to reduce the voltage ripple. For a medium voltage drive operating at a voltage range of between approximately 4160 and 13800 volts, this capacitance bank can be on the order of between approximately 0.04 and 0.5 Farads. Besides, the diode-based rectifier does not provide control over the reactive input current component, and the diode-based rectifier does not provide the regenerative operating mode as required, for instance, by downhill belt conveyors in mining applications, where this operating mode is the normal one, as several megawatts are required to be taken back to the AC drive.

Voltage and current harmonics in power transmission and distribution have become a serious problem. To limit the harmonic components of the input current of the drive, often phase-shifted multi-windings isolation transformers are used to supply power to the cells. However, to meet the requirements of the IEEE 519 standard, the impedance of the transformer should be high (typically on the order of approximately 8 to 15% PU for medium voltage drives) and a large amount of capacitance must be accommodated in the DC bus of power cells, which make both transformers and power cells bulky and expensive.

SUMMARY OF THE INVENTION

One aspect of the present invention is directed to a medium voltage drive system that includes multiple power cells each to couple between a transformer and a load. A first subset of the power cells are configured to provide power to the load and to perform partial regeneration from the load, and a second subset of the power cells are configured to provide power to the load but not perform the partial regeneration. A controller may be included in the system to simultaneously control a DC bus voltage of at least one of the first subset of the power cells, correct a power factor of the system, and provide harmonic current compensation for the system.

Yet another aspect is directed to a method for receiving various information in a partial regenerative drive system and controlling the system based on the information. Such information may include input current and voltage to a transformer, input current to an active front end of a regenerative cell, and a bus voltage of the regenerative cell. From this information, a harmonic current reference, an active power current reference, and a reactive power current reference can be independently generated. Then a first portion of the harmonic current reference can be combined with the active power current reference and a second portion combined with the reactive power current reference. From the combined current references, control signals can be generated for the active front end.

Another aspect of the present invention is directed to a system including transformers, phase output lines, and at least one controller. The transformers may include multiple modular transformers, where at least one first modular transformer is not phase shifted and is coupled to a regeneration power cell, and at least one second modular transformer that is phase shifted is coupled to a non-regeneration power cell. The cells may be coupled to phase output lines having at least one regeneration power cell and non-regeneration power cell. In one embodiment, the controller may simultaneously control a bus voltage of a regeneration power cell, correct a power factor of the system, and provide harmonic current compensation for the system.

DETAILED DESCRIPTION

Embodiments may provide a harmonics current-free partial regenerative high power medium voltage drive. By providing a drive having at least some regenerative power capability, higher performance can be realized in applications that have faster deceleration times. Some implementations can be used for applications such as test benches for motors and transmissions, oil pumps, heavy-duty cranes handling freight containers, centrifuges in food production and process industries, rolling mills, sheet-metal presses, cable-car controls, ski lifts, pump control at water treatment plants, and HVAC chiller control for office buildings. In addition, regenerative power cells of the drive may also perform as an active filter and power factor corrector to compensate for harmonics currents as well as reactive power of the drive, which are generated by non-regenerative (e.g., diode front-end) power cells.

To enable such regeneration, embodiments may replace a passive (e.g., diode-based) rectifier of one or more power cells with an active front-end rectifier, allowing control of the active and reactive input current components and harmonics compensation. In addition, a control strategy to simultaneously control the DC-bus voltage, correct the power factor of the drive system, and compensate for harmonics current of the drive system may be implemented. Since the active front-end converters can compensate for harmonics of the passive rectifier currents, the size of capacitor banks in the individual cells and transformer impedance can be reduced, resulting in lower costs and lower size of the individual cells. While the scope of the present invention is not limited in this regard, in some medium voltage drive embodiments capacitance banks may be between approximately 0.002 and 0.05 Farads, and the transformer impedance less than approximately 7% PU. The control strategy also allows power recovery during, e.g., deceleration, by putting energy back into the utility.

Figure 1:
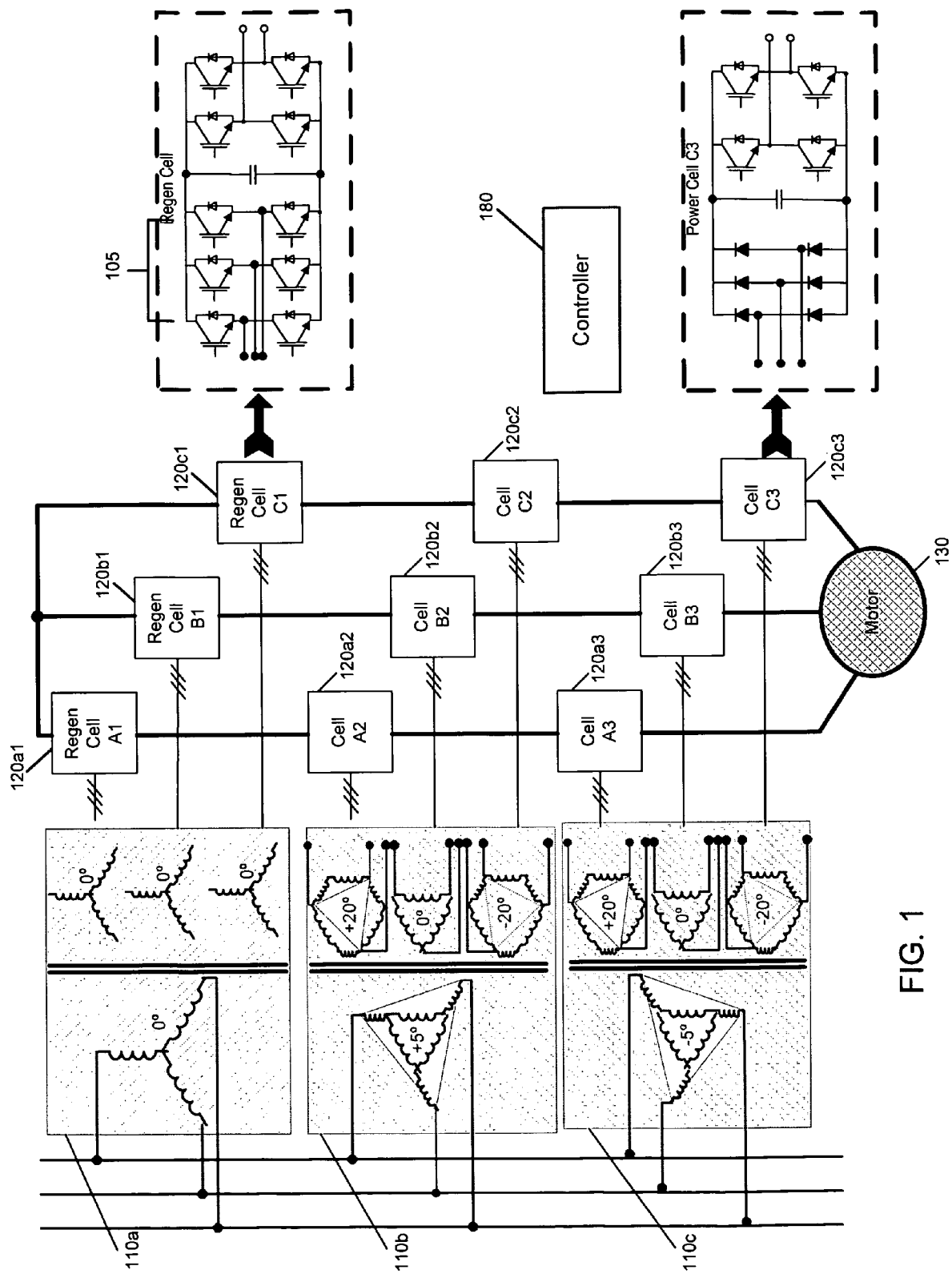
FIG. 1 is a block diagram of an inverter in accordance with an embodiment of the present invention.

Referring now to FIG. 1, shown is a block diagram of an inverter in accordance with an embodiment of the present invention. More specifically, FIG. 1 shows an implementation of a symmetrical cascaded medium voltage inverter with partial regeneration capability for a three-phase motor. As shown in FIG. 1, inverter 100 may include modular transformers $110_b$ and $110_c$ with passive phase shifting, realized by both phase shifting of primary windings and secondary windings. Still further, at least one other modular transformer $110_a$ may be provided that is not phase shifted. However, the outputs of this modular transformer may be provided to power cells of a different configuration than the other power cells. Specifically, these power cells $120_{a1}$-$120_{c1}$ may be regenerative power cells having an active front end, e.g., implemented by way of IGBTs 105. When these front end IGBTs are controlled accordingly, a relatively pure sinusoidal current in the main side (i.e., input current to the drive) having a minimal harmonic distortion is realized.

Nonetheless, the winding sets of the primary and secondary transformer modules $110_b$ and $110_c$ that supply power to the other power cells can be phase shifted to minimize the harmonics in the main current. Implementations of such phase-shifting transformers are described in more detail in U.S. patent application Ser. Nos. 12/284,649 and 12/284,654, commonly assigned herewith, the disclosures of which are hereby incorporated by reference. In this example, the primaries are phase shifted by 10° and the secondaries are phase shifted by 20°. Thus in the embodiment of FIG. 1, an equivalent 36-pulse transformer can be realized using two 18-pulse transformers $110_b$ and $110_c$ with phase shifted primaries. However, the phase shifting is not needed for the transformer module $110_a$, as the electronically controlled active front-end 105 of the power cell will compensate for harmonics of itself and remaining harmonics of the non-regenerative cells. Hence the MV drive draws nearly pure sinusoidal current from the utility.

Furthermore, by providing an active front end, this implementation provides the ability for partial regeneration. Of course, other implementations are possible using different combinations of active and passive transformers, as well as control means for actively controlling one or more power cells. Note that in the embodiment of FIG. 1, a controller 180 may be coupled to the power cells (note the connections are not shown in FIG. 1 for ease of illustration). This controller is representative, and in particular implementations multiple such controllers may be provided, e.g., local controllers associated with one or more power cells, and a master controller to control the drive system as a whole. Furthermore, this controller may provide control of the active switching of the front end IGBTs of power cells $120_{a1}$-$120_{c1}$ to enable a nearly pure sine wave input current to the drive, as well as to enable a partial regeneration mode.

In the configuration of FIG. 1, three symmetrical cells in series (e.g., cells $120_{a1}$-$120_{a3}$) may form one motor phase voltage. The actual number of series-connected cells is determined by the required load voltage and power. The phase voltages of the load (e.g., motor 130) are the summation of the single-phase voltage generated by each cell. In the example shown in FIG. 1, active front-end converters $120_{a1}$-$120_{c1}$ are used to supply power to one cell of each phase. Other power cells $120_{a2}$-$120_{a3}$ have passive diode front-end rectifiers. As shown in this embodiment, each power cell 120 can be an H-bridge inverter, although the scope of the present invention is not limited in this regard. This configuration will allow up to 33% regeneration power, i.e., one of the three power cells in each phase line is capable of regeneration. However, if the regenerative cell size is larger than the non-regenerative cell size, the amount of regeneration power can be higher.

As mentioned above, a control strategy in accordance with an embodiment of the present invention can simultaneously compensate for current harmonics of the drive, regulate the DC-bus voltage of the supplied cell, correct the power factor of the drive system, and control the recovered power. In so doing, the need for a front end filter coupled between utility connection and input to the transformer can be avoided. That is, rather than a conventional system that implements an active filter (which is typically a separate component coupled between utility and transformer), drive systems as disclosed herein can be directly coupled to a utility connection. As such the expense and complexity of an added front end component to perform harmonic compensation can be avoided.

Figure 2:
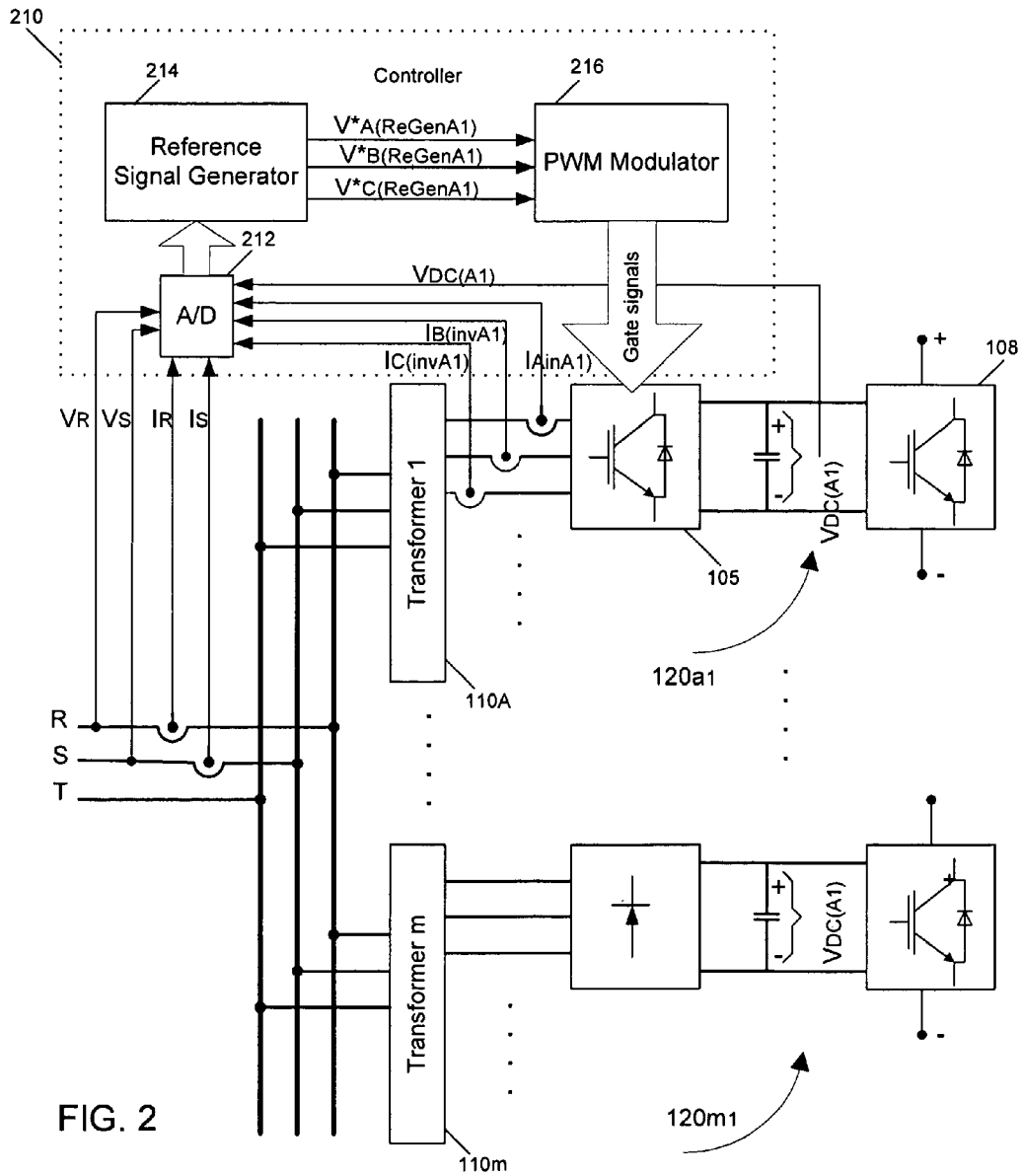
FIG. 2 is a functional block diagram of a control strategy in accordance with one embodiment of the present invention.

Referring now to FIG. 2, shown is a functional block diagram of a control strategy in accordance with one embodiment of the present invention. For simplicity, only one regeneration power cell $120_{a1}$ has been shown, along with a single passive power cell $120_{m1}$. As shown in FIG. 2, system 200 includes a controller 210. In various embodiments, controller 210 may be a digital controller that can be implemented using hardware, software, firmware or combinations thereof. As examples, controller 210 may be a digital signal processor (DSP), a microcontroller, a field programmable gate array (FPGA), a dedicated or general-purpose microprocessor or the like. Note that controller 210 may be a local controller only to control the active front end 105 of power cell 120. Multiple such controllers may be provided, one for each individual active regeneration power cell. While not shown, in some implementations a separate controller may be present to control the H bridge 108 of the corresponding regeneration power cell. Similar such controllers may be provided for each of the passive power cells, e.g., power cell $120_{m1}$. In yet additional embodiments, another controller can be provided, such as a master controller that in turn can provide control signals to controller 210, e.g., to disable certain correction and compensation features during transient load conditions.

As shown in FIG. 2, controller 210 may include various components, which may be formed of dedicated hardware and/or programmable control modules. In the implementation shown in FIG. 2, these components may include an analog-to-digital converter (ADC) 212, which is coupled to receive and digitize various inputs. As seen in FIG. 2, in one embodiment, the DC-link voltage, input currents to regeneration cell $120_{a1}$, input currents and voltages to the drive (e.g., from the utility or other input power source) are sensed through voltage and current sensors (not shown for ease of illustration in FIG. 2) and can be converted to digital format in ADC 212. Other sensing mechanisms and monitoring information can be used in other embodiments.

The digitized data may then be provided to a reference signal generator 214, which may implement one or more control algorithms in accordance with an embodiment of the present invention. In turn, the output of reference signal generator 214, which may be a plurality of voltage reference signals, e.g., a single voltage reference signal for each phase of the regeneration power cell to be controlled, may be provided to a pulse width modulation (PWM) modulator 216. From these voltage reference signals, PWM modulator 216 may generate control signals (e.g., gate signals) to control the active front-end of regeneration cell 120, namely switching signals to control IGBTs 105. While shown with this particular implementation in FIG. 2, understand that in some implementations at least portions of the controller 200 can be realized as computer-readable instructions that are stored on a tangible storage medium, such as instructions stored in a memory for reading by a processor such as a DSP or programmable processor to perform the described operations.

Figure 3:
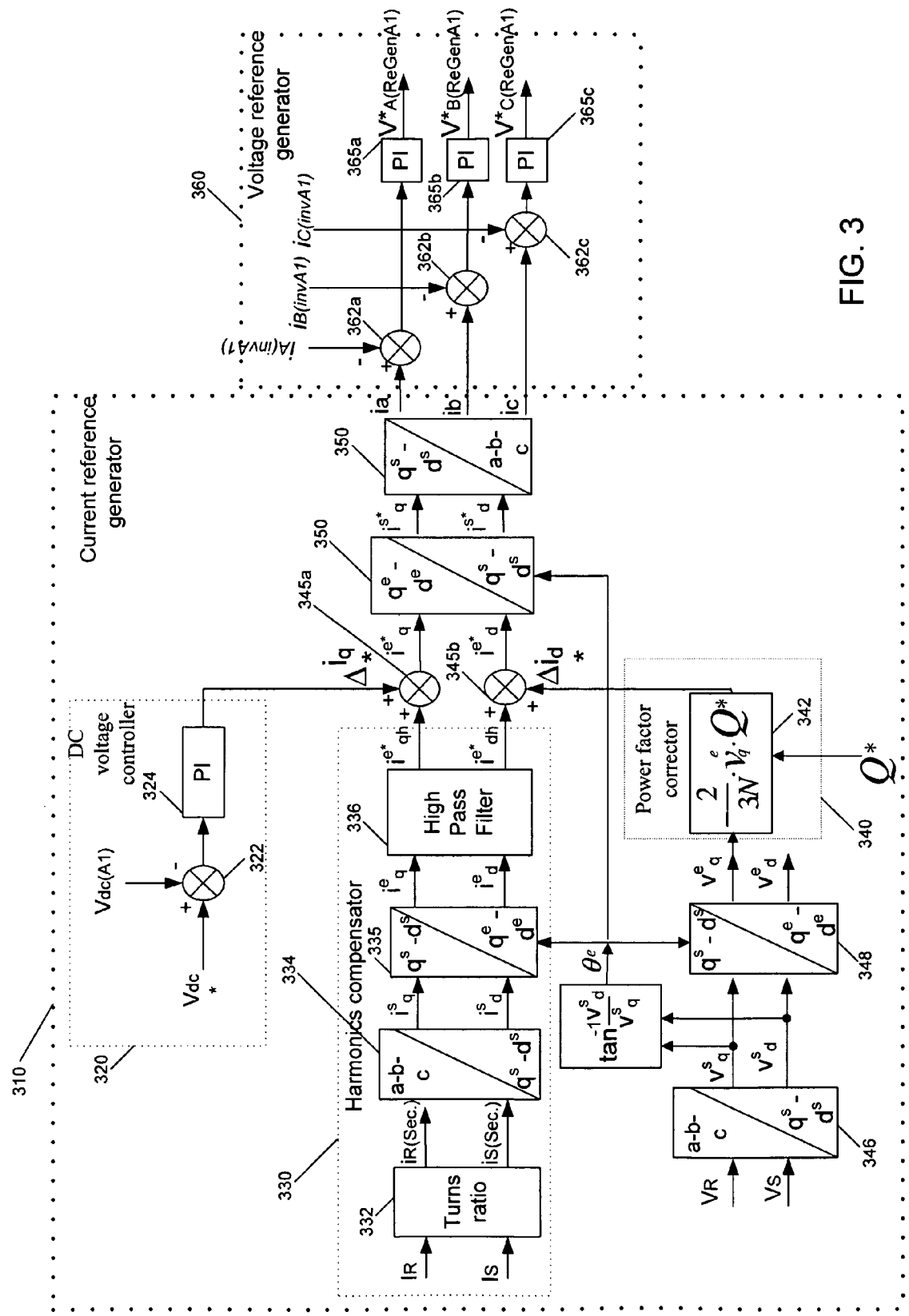
FIG. 3 is a block diagram of a more detailed view of a reference signal generator in accordance with an embodiment of the present invention.

Referring now to FIG. 3, shown is a block diagram of a more detailed view of a reference signal generator in accordance with an embodiment of the present invention. As an example, reference signal generator 300 may take the form of reference signal generator 214 in FIG. 2. In general, reference signal generator 300 may include a current reference generator 310 which, based on the inputs, may provide reference currents to a voltage reference generator 360 that in turn provides the voltage reference signals to a control mechanism, e.g., PWM modulator 216 of FIG. 2.

Current reference generator 310 may include independent control and compensation mechanisms for all of DC voltage control, harmonic current compensation, and power factor correction. More specifically, current reference generator 310 may include a DC voltage controller 320, a harmonics compensator 330, and a power factor corrector 340. The resulting outputs of these independent control and compensation mechanisms may be appropriately combined by way of summing blocks and a matrix transformer 350. As will be described below, some implementations may selectively enable/disable at least one of the harmonic current compensation and the power factor correction, possibly under transient load conditions.

As seen, the variable information obtained via the voltage and current sensors may be used in current reference generator 310. Specifically, the DC bus voltage ($V_{DC(A1)}$) obtained from the DC bus voltage of regeneration cell $120_{A1}$ may be provided to DC voltage controller 320. In turn, the input current obtained, e.g., from the utility, is provided to harmonics compensation 330. Power factor corrector 340 further receives the input voltage to the transformer. To achieve the decoupled control of active, reactive and harmonics currents, the variables can be transformed to two phase q-d rotating reference frame rotating at angular displacement of supply $\Theta$. This arbitrary q-d reference frame is explained using the following equations:

$$\begin{bmatrix} f_q \\ f_d \\ f_0 \end{bmatrix} = T(\Theta) \cdot \begin{bmatrix} f_a \\ f_b \\ f_c \end{bmatrix} \quad [\text{Eq. 1}]$$

where $$T(\Theta) = \begin{bmatrix} \cos\Theta & \cos\left(\Theta - \frac{2\pi}{3}\right) & \cos\left(\Theta + \frac{2\pi}{3}\right) \\ \sin\Theta & \sin\left(\Theta - \frac{2\pi}{3}\right) & \sin\left(\Theta + \frac{2\pi}{3}\right) \\ \frac{1}{\sqrt{2}} & \frac{1}{\sqrt{2}} & \frac{1}{\sqrt{2}} \end{bmatrix} \quad [\text{Eq. 2}]$$

Note that $T(\Theta)$ is the transformation matrix and f represents currents or voltages. This transformation transfers the three-phase stationary parameters, $f_a$, $f_b$, $f_c$ from a-b-c system to two-phase orthogonal rotating reference frame. However, this transformation may be performed in two steps to transfer the parameters to rotating excitation reference frame $q^e$-$d^e$. The first step is to transfer three phase stationary parameters $f_a$, $f_b$, $f_c$ from a-b-c system to two-phase orthogonal stationary reference frame $q^s$-$d^s$ by substituting $\theta=0$ in Eq.2 (and shown in transformation matrices 334 and 346). In the second transformation the vectors in 2-phase orthogonal stationary system $f_q^s$ and $f_d^s$ are converted to orthogonal reference frame $f_q^e$ and $f_d^e$ (and shown in transformation matrices 335 and 348). This transformation can be shown by the following equations:

$$f_q^e = \cos\theta_e \cdot f_q^s - \sin\theta_e \cdot f_d^s \quad [\text{Eq. 3}]$$

$$f_d^e = \sin\theta_e \cdot f_q^s + \cos\theta_e \cdot f_d^s \quad [\text{Eq. 4}]$$

$$\theta_e = \tan^{-1}\frac{f_d^s}{f_q^s} \quad [\text{Eq. 5}]$$

In general in this reference frame, active power or DC-bus voltage is controlled by the q-axis current component, and reactive power or power factor is controlled by the d-axis current component. The active power and reactive power in two-phase excitation reference frame can be calculated as follows:

$$P = \frac{3}{2} v_q^e \cdot i_q^e \quad [\text{Eq. 6}]$$

$$Q = -\frac{3}{2} v_q^e \cdot i_d^e \quad [\text{Eq. 7}]$$

where $v_q^e$ is the quadrature component of voltage in two-phase excitation reference frame, $i_q^e$ the quadrature component of current in two-phase excitation reference frame and $i_d^e$ the direct component of current in two-phase excitation reference frame. For three-phase balanced system, $v_q^e$ is equal to peak magnitude of voltages in a-b-c system. Hence, the active power can be controlled by $i_q^e$ and reactive power can be controlled by $i_d^e$. The current references in excitation two-phase reference frame ($i_q^{e*}$ and $i_d^{e*}$) can be generated using the following equations:

$$i_q^{e*} = \Delta i_q^* + i_{qh}^{e*} \quad [\text{Eq. 8}]$$

$$i_d^{e*} = \Delta i_d^* + i_{dh}^{e*} \quad [\text{Eq. 9}]$$

The DC bus voltage or active power is controlled by the $\Delta i_q^*$ component, and power factor or reactive power is controlled by the $\Delta i_d^*$ component. Further, harmonics compensation can be controlled by $i_{qh}^{e*}$ and $i_{dh}^{e*}$ components.

As seen in FIG. 3, $\Delta i_q^*$ is generated in DC voltage controller 320 by subtraction of a DC-bus voltage command $V_{dc}^*$ signal, which may be set by user, from the DC-bus voltage feedback ($V_{dc(a1)}$) in a summer 322. The result is then passed through a proportional-integral (PI) controller 324. In turn, $\Delta i_d^*$ in power factor corrector 340 can be calculated using Eq.7 in following manner:

$$\Delta i_d^* = \frac{2}{3N} v_q^e \cdot Q^* \quad [\text{Eq. 10}]$$

where N is turns ratio of transformer 110a. $Q^*$ is reactive power command, and $v_q^e$ is quadrature component of input voltage to drive in two-phase excitation reference frame. Q* can be set by user as arbitrary value or can be instantaneous reactive power into the drive.

To perform harmonics current compensation control, harmonics current references may be generated in two-phase rotating reference frame. The currents of phase R ($I_R$) and phase S ($I_S$) of the drive can be sensed through current sensors or via a current transformer (CT). Assume that the turns ratio (which can be set in a turns ratio calculator 332) of the isolation transformer is N and number of regenerative units is equal to m, the input current to regeneration cell 120 can be estimated as:

$$i_{R(Sec.)} = \frac{N \cdot}{m} I_R \quad [\text{Eq. 11}]$$

$$i_{S(Sec.)} = \frac{N \cdot}{m} I_s \quad [\text{Eq. 12}]$$

where $i_{R(Sec.)}$ and $i_{s(Sec.)}$ are transformed to two-phase excitation reference frame in a matrix transformers 334 and 335 using Equations 1 through 5 to generate $i_q^e$ and $i_d^e$. The harmonics current reference frame in two-phase rotating reference frame $i_{qh}^{e*}$ and $i_{dh}^{e*}$ can then be generated by passing $i_q^e$ and $i_d^e$ through a high pass filter 336 to reject the DC components.

Thus the outputs from harmonics compensator 330, namely $i_{qh}^{e*}$ and $i_{dh}^{e*}$ may be summed with the active power current reference, $\Delta I^*_q$, obtained from voltage controller 320 and the reactive power current reference, $\Delta I^*_d$, obtained from power factor corrector 340, via summers 345a and 345b, respectively. These combined reference currents then may be provided to another transformation matrix 350, which takes the d-q reference frame components and converts them back to three-phase components. As seen, these reference current outputs may be output to voltage reference generator 360.

These three phase reference currents, $i^*_a$, $i^*_b$, $i^*_c$, and sensed current values from the active front end may be the inputs to voltage reference generator 360, which may generate voltage reference signals. As seen, in FIG. 3, the three-phase current references ($i_a^*$, $i_b^*$, $i_c^*$) are provided to voltage reference generator 360, and from which are subtracted feedback currents of the front-end converter of regeneration cell $120_{a1}$ ($i_{A(invA1)}$, $i_{B(invA1)}$, $i_{C(invA1)}$) in corresponding summers 362a-362c. The results are passed through corresponding PI controllers 365a-365c to generate the three phase voltage references ($V_{A*(ReGenA1)}$, $V_{B*(ReGenA1)}$, $V_{C*(ReGenA1)}$), where $V_{A*(ReGenA1)}$ is the voltage reference for phase A of regeneration cell $120_{A1}$; $V_{B*(ReGenA1)}$ is the voltage reference for phase B of regeneration cell A1, and $V_{C*(ReGenA1)}$ is voltage reference for phase C of regeneration cell $120_{A1}$. In this way, control of active power, reactive power and harmonics compensation of the drive are decoupled and can be simultaneously done.

Figure 4:
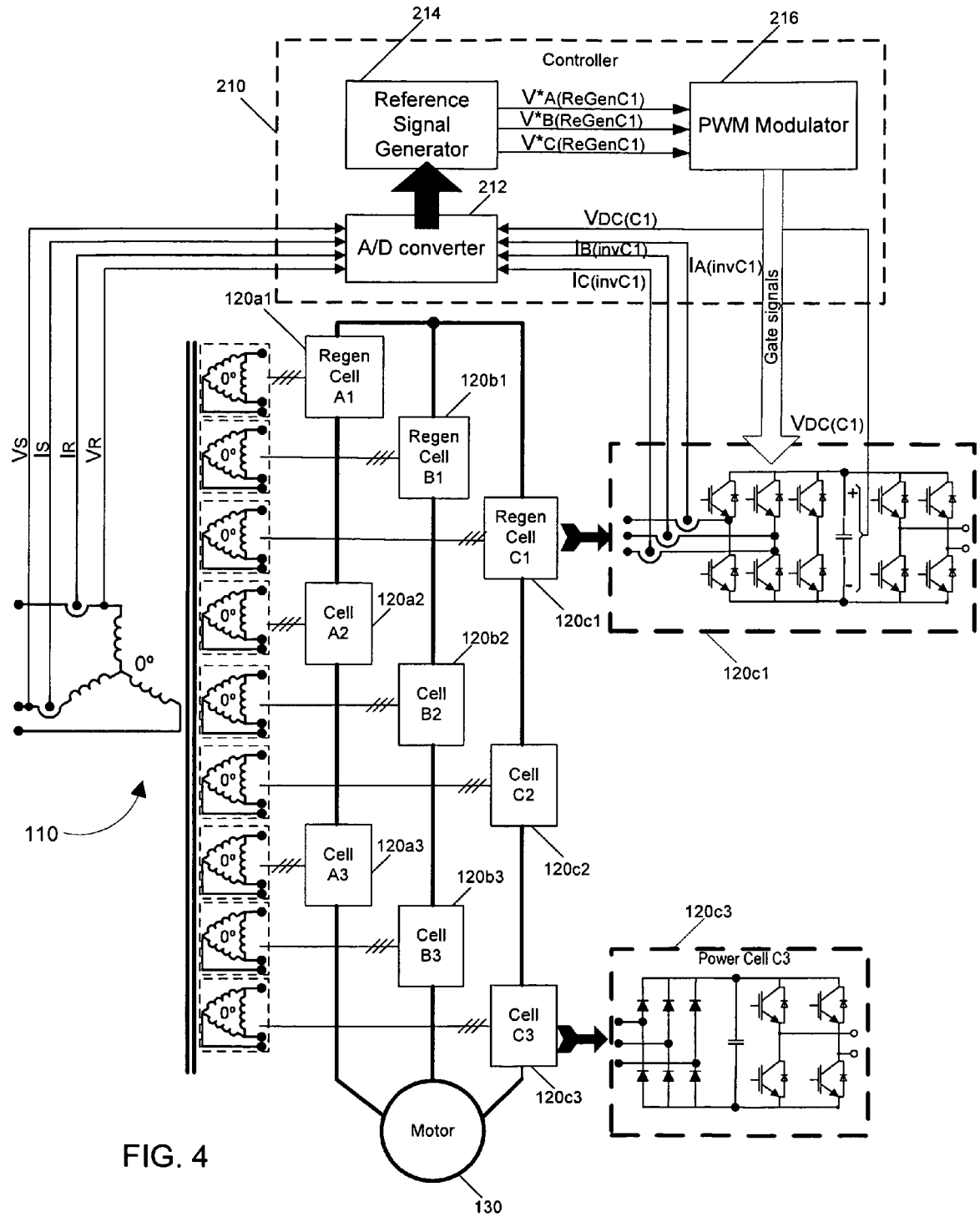
FIG. 4 is a block diagram of a drive in accordance with another embodiment of the present invention.

FIG. 4 is a block diagram of a drive in accordance with another embodiment of the present invention. In this example, a single non-phase shifting isolating transformer 110 is used. The same control strategy described above can be applied to control the active front-ends 105 of regeneration cells $120_{a1-c1}$. Hence, the power factor and harmonics current of the other passive front rectifiers of power cells $120_{a2-c3}$ can be compensated by these active front-end converters. In this way, the input current to drive system 100' can be made harmonics free. Note that embodiments can be applied to both symmetric or asymmetric cascaded multi-level inverters.

Figure 5:
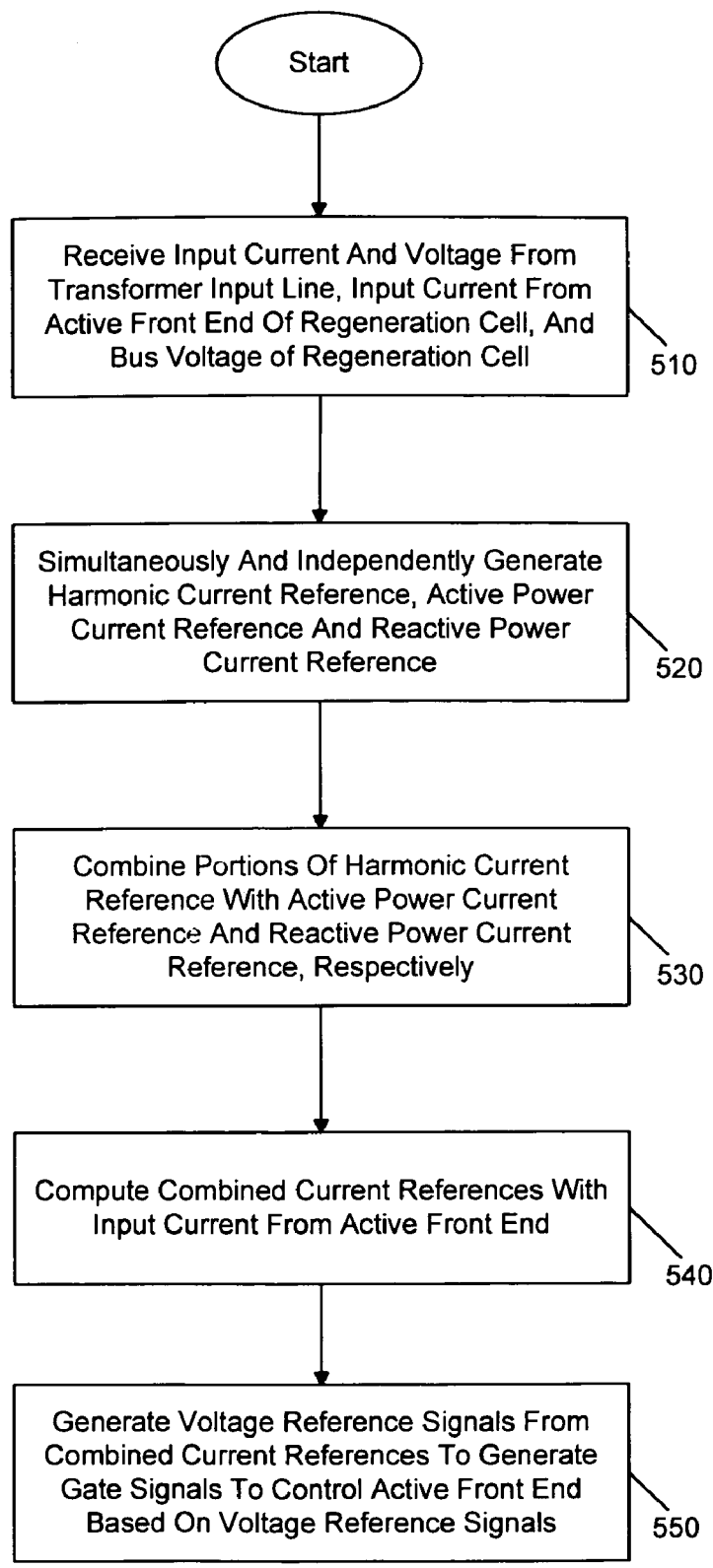
FIG. 5 is a flow diagram of a method in accordance with one embodiment of the present invention.

Referring now to FIG. 5, shown is a flow diagram of a method in accordance with one embodiment of the present invention. Method 500 may be implemented using individual local controllers for controlling the front end of each regeneration cell, as well as potentially to control the back end H-bridge of such regeneration cells. In addition, local controllers can handle back end switching of non-regeneration power cells. Still further, a master controller may handle some or all of the steps set forth, in certain implementations.

As shown in FIG. 5, method 500 may begin by receiving various input information from a drive system (block 510). More specifically, this information may include input current and voltage from a transformer input line, input current from an active front end of a regeneration cell, as well as the cell's DC bus voltage. Based on this information, a harmonic current reference, active power current reference, and reactive power current reference may be simultaneously and independently generated (block 520). However, understand that as discussed above, e.g., based on transient mode conditions, one or more of the harmonic current reference and reactive power current reference may be at least temporarily disabled. Based on the information obtained, portions of the harmonic current reference may be combined with the active power current reference and reactive power current reference, respectively (block 530). Based on this information, combined current references may be computed in combination with input current feedback information, obtained from the active front end (block 540). Finally, voltage reference signals may be generated from the combined current references in block 550. More specifically, such voltage reference signals may be used to generate gate signals to control the active front end of a given regeneration power cell. While shown with this particular implementation in the embodiment of FIG. 5, understand the scope of the present invention is not limited in this regard.

Figure 6:
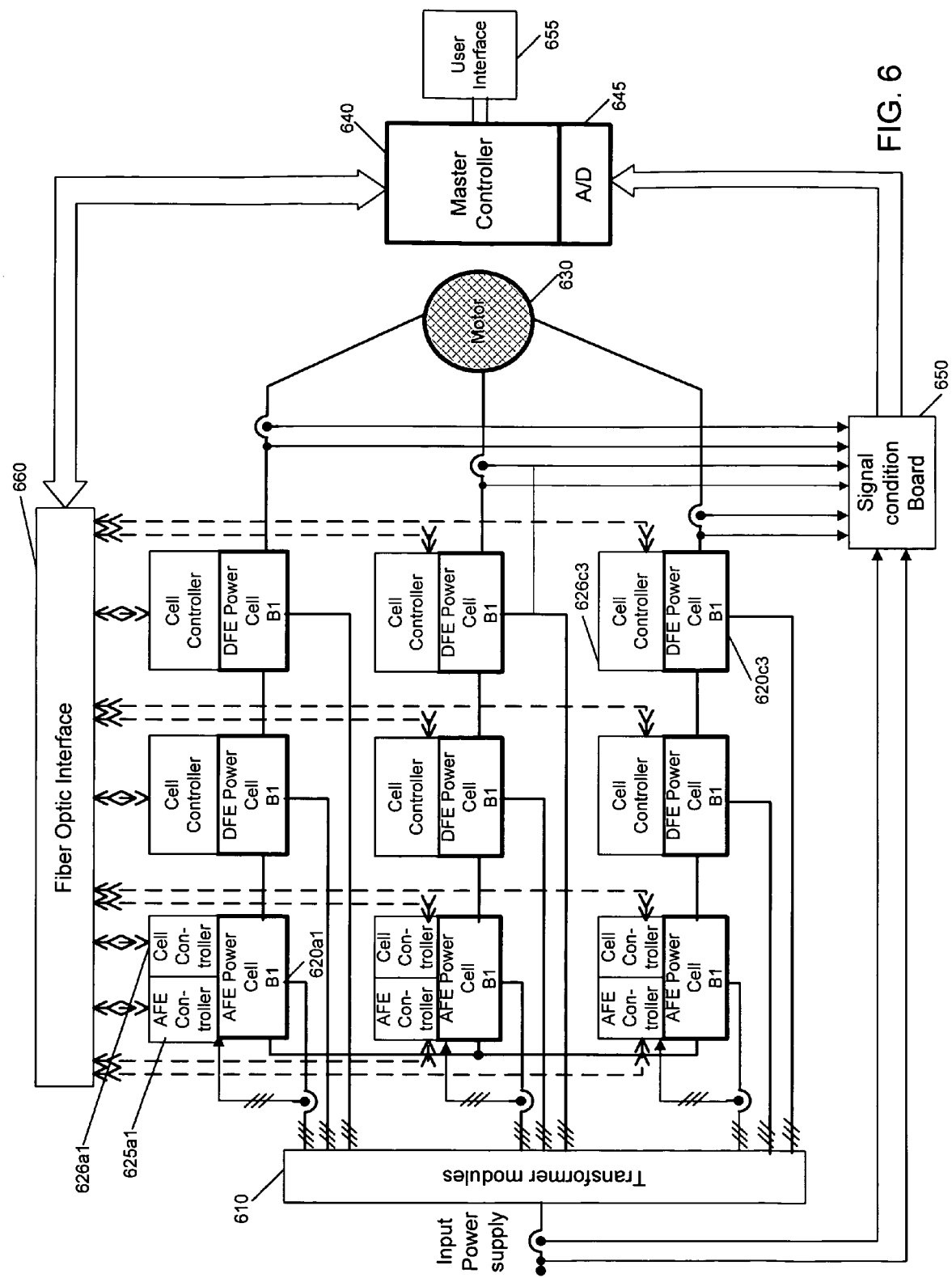
FIG. 6 is a block diagram of a system in accordance with another embodiment of the present invention.

Referring now to FIG. 6, shown is a block diagram of a system in accordance with another embodiment of the present invention. As shown in FIG. 6, system 600 may be a medium-voltage drive including both active and passive power cells. Specifically, in the embodiment of FIG. 6, a three-phase, medium-voltage drive is shown that includes a plurality of active front-end power cells $620_{A1}$-$620_{C1}$ and multiple passive front-end power cells, namely power cells $620_{A2}$-$620_{C3}$.

As seen, different types of local controllers may be present to control these different power cells. Specifically, the active power cells include an active front controller $625_{A1}$-$625_{A3}$ and a local cell controller $626_{A1}$-$626_{A3}$, which are to control the front end and back end switching elements of the power cells, respectively. Instead, passive power cells $620_{A2}$-$620_{C3}$ include only a single local cell controller $626_{A2}$-$626_{C3}$.

As seen, each of these local controllers may communicate with a fiber optic interface 660. In some implementations, a pair of unidirectional fiber optic channels may be coupled between each local controller and fiber optic interface 660. In turn, fiber optic interface 660 communicates with a master controller 640 that further includes an ADC 645.

Master controller 640 may provide control signals to fiber optic interface 660 for transmission to the different local controllers. In one embodiment, these control signals may be voltage reference signals, which cause the local controllers to perform certain processing to generate the needed switching signals. In other implementations, the switching signals themselves may be sent by master controller 640 for transmission to the local cell controllers.

As further seen in FIG. 6, a signal conditioning board 650 may be present to sense or perform signal processing with regard to various information, namely voltage and/or current information obtained both from the input power source and the output of the different phase output lines coupled to a load 630 which in one embodiment may be a motor.

In addition to the control information described above, additional information from master controller 640 can be provided to the individual local controllers. In addition, the local controllers can provide information such as status information, both as to normal operation as well as faults, over-temperature situations or so forth, back to master controller 640. Master controller 640 may further be associated with a user input device 655 such as a keyboard and/or touch screen display to enable user input to control various features such as speed, torque, selection of different power cells to be enabled and so forth, as well as to provide status information to the user via a given display or other output means. While shown with this particular implementation in the embodiment of FIG. 6, the scope of the present invention is not limited in this regard.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A medium voltage drive system comprising:
   a plurality of power cells each to couple between a transformer and a load, wherein a first subset of the power cells each including an active front end are configured to provide power to the load and to perform partial regeneration from the load, and a second subset of the power cells are configured to provide power to the load but not perform the partial regeneration; and
   a controller coupled to the plurality of power cells to simultaneously control a DC bus voltage of at least one of the first subset of the power cells, correct a power factor of the system, and provide harmonic current compensation for the system, the controller including a digitizer to digitize voltage signals and current signals from an input to the transformer, input current signals to the active front end, and the DC bus voltage and provide the digitized information to a reference signal generator, the reference signal generator to generate reference signals to provide to a modulator, the modulator to provide gate signals to the active front end of each of the first subset of the power cells based on the reference signals.

2. The system of claim 1, wherein each of the first subset of the power cells receive gate signals from the controller.

3. The system of claim 1, further comprising a master controller to generate control signals to selectively disable at least one of the power factor correction and the harmonic current compensation controlled by the controller.

4. The system of claim 3, wherein the master controller is to selectively disable based on transient conditions of the load.

5. The system of claim 1, wherein the controller includes a harmonic compensator to generate a harmonic current reference, a voltage controller to generate an active power current reference, and a power factor corrector to generate a reactive power current reference.

6. The system of claim 5, wherein the controller is to generate a first current reference signal from combination of a first portion of the harmonic current reference and the active power current reference, and a second current reference signal from combination of a second portion of the harmonic current reference and the reactive power current reference.

7. The system of claim 1, further comprising a second controller to control switching of a back end of at least one of the first subset of the power cells.

8. A method comprising:
   receiving information regarding an input current and input voltage to a transformer of a partial regenerative drive system, regarding an input current to an active front end of a regenerative cell of the partial regenerative drive system, and regarding a bus voltage of the regenerative cell;
   independently generating a harmonic current reference, an active power current reference, and a reactive power current reference from the information;
   combining a first portion of the harmonic current reference with the active power current reference and combining a second portion of the harmonic current reference with the reactive power current reference; and
   generating control signals for the active front end using the combined current references.

9. The method of claim 8, further comprising determining a secondary current from the input current to the transformer and converting the secondary current to a two-phase rotating reference frame, and filtering the secondary current to generate the harmonic current reference.

10. The method of claim 9, further comprising generating the reactive power current reference based on the input current and input voltage to the transformer.

11. The method of claim 10, further comprising combining the bus voltage information and a reference bus voltage and processing the combined voltage in a proportional-integral controller to generate the active power current reference.

12. The method of claim 11, further comprising combining the combined current references with the information regarding the input current to the active front end.

13. The method of claim 8, further comprising selectively disabling at least one of the reactive power current reference generation and the harmonic current reference generation based at least in part on transient conditions of a load coupled to the partial regenerative drive system.

14. A system comprising:
   a plurality of modular transformers, wherein at least one first modular transformer includes a non-phase-shifted primary winding coupled to an input power source and non-phase-shifted secondary windings each coupled to a regeneration power cell, and at least one second modular transformer including a phase-shifted primary winding coupled to the input power source and a plurality of phase-shifted secondary windings each coupled to a non-regeneration power cell;
   a first phase output line having at least a regeneration power cell and a non-regeneration power cell;
   a second phase output line having at least a regeneration power cell and a non-regeneration power cell;
   a third phase output line having at least a regeneration power cell and a non-regeneration power cell; and
   a controller to simultaneously control a bus voltage of a regeneration power cell, correct a power factor of the system, and provide harmonic current compensation for the system, wherein the controller includes a harmonic compensator to generate a harmonic current reference, a voltage controller to generate an active power current reference, and a power factor corrector to generate a reactive power current reference.

15. The system of claim 14, wherein the controller comprises a local controller associated with the regeneration power cell of the first phase output line to control a front end of the regeneration power cell, and further comprising a master controller coupled to the local controller, wherein the master controller is to generate control signals to selectively disable at least one of the power factor correction and the harmonic current compensation controlled by the local controller.

16. The system of claim 15, wherein the local controller comprises a first local controller to control the regeneration power cell front end and a second local controller to control a back end of the regeneration power cell.

17. The system of claim 14, wherein the controller includes:
   a digitizer to digitize voltage signals and current signals from the input power source, input current signals to the regeneration power cell, and the bus voltage of the regeneration power cell; and
   a reference signal generator to receive the digitized information to generate reference signals to provide to a modulator to generate gate signals for a front end of the regeneration cell based on the reference signals.

* * * * *